US010674738B2

(12) United States Patent
Fitch et al.

(10) Patent No.: US 10,674,738 B2
(45) Date of Patent: Jun. 9, 2020

(54) STARCH COATED POLYESTER FILM FOR RELEASE OF CANNED MEAT PRODUCTS

(71) Applicant: TORAY PLASTICS (AMERICA), INC., North Kingstown, RI (US)

(72) Inventors: John Fitch, Middletown, RI (US); Jan Moritz, Bristol, RI (US); Pat Andrews, West Kingstown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 324 days.

(21) Appl. No.: 14/587,938

(22) Filed: Dec. 31, 2014

(65) Prior Publication Data
US 2016/0183544 A1    Jun. 30, 2016

(51) Int. Cl.
| B32B 27/36 | (2006.01) |
| B32B 27/08 | (2006.01) |
| B32B 7/02 | (2019.01) |
| B65D 1/12 | (2006.01) |
| B65D 6/00 | (2006.01) |
| C09D 5/16 | (2006.01) |
| C09D 103/00 | (2006.01) |
| C09D 7/20 | (2018.01) |
| C09D 191/06 | (2006.01) |
| C09D 7/40 | (2018.01) |
| C08L 91/06 | (2006.01) |
| C08L 3/00 | (2006.01) |
| C08K 5/07 | (2006.01) |
| C08K 5/00 | (2006.01) |
| C08K 3/20 | (2006.01) |
| C08K 3/105 | (2018.01) |
| A23B 4/32 | (2006.01) |
| A23B 4/005 | (2006.01) |

(52) U.S. Cl.
CPC .............. *A23B 4/32* (2013.01); *B32B 27/08* (2013.01); *B32B 27/36* (2013.01); *A23B 4/0056* (2013.01); *B32B 7/02* (2013.01); *B32B 2250/02* (2013.01); *B32B 2250/244* (2013.01); *B32B 2255/00* (2013.01); *B32B 2255/10* (2013.01); *B32B 2255/26* (2013.01); *B32B 2307/30* (2013.01); *B32B 2307/306* (2013.01); *B32B 2307/31* (2013.01); *B32B 2307/412* (2013.01); *B32B 2307/518* (2013.01); *B32B 2307/54* (2013.01); *B32B 2307/702* (2013.01); *B32B 2307/704* (2013.01); *B32B 2307/714* (2013.01); *B32B 2307/7244* (2013.01); *B32B 2307/7246* (2013.01); *B32B 2307/748* (2013.01); *B32B 2307/752* (2013.01); *B32B 2367/00* (2013.01); *B32B 2391/00* (2013.01); *B32B 2439/66* (2013.01); *B32B 2439/70* (2013.01); *B65D 1/12* (2013.01); *B65D 7/00* (2013.01); *B65D 2581/34* (2013.01); *C08K 3/105* (2018.01); *C08K 3/20* (2013.01); *C08K 5/0025* (2013.01); *C08K 5/07* (2013.01); *C08L 3/00* (2013.01); *C08L 91/06* (2013.01); *C08L 2201/54* (2013.01); *C08L 2312/00* (2013.01); *C09D 5/16* (2013.01); *C09D 5/1656* (2013.01); *C09D 7/20* (2018.01); *C09D 7/40* (2018.01); *C09D 103/00* (2013.01); *C09D 191/06* (2013.01); *Y10T 428/24942* (2015.01); *Y10T 428/31786* (2015.04); *Y10T 428/31801* (2015.04); *Y10T 428/31971* (2015.04)

(58) Field of Classification Search
None
See application file for complete search history.

(56) References Cited

U.S. PATENT DOCUMENTS

| 3,645,757 A * | 2/1972 | Gordon | B65D 81/24 426/415 |
| 4,456,164 A * | 6/1984 | Foster | B65D 77/2032 229/125.35 |
| 4,609,589 A * | 9/1986 | Hosoda | B32B 15/12 428/352 |
| 5,059,460 A * | 10/1991 | Heyes | B32B 15/08 428/35.3 |
| 5,494,716 A * | 2/1996 | Seung | B65D 81/343 428/34.2 |
| 5,858,487 A * | 1/1999 | Boehler | B32B 27/10 428/34.3 |
| 5,945,468 A * | 8/1999 | Atkinson | C09D 103/06 428/352 |
| 5,981,011 A * | 11/1999 | Overcash | D21H 16/16 428/34.2 |
| 6,066,368 A * | 5/2000 | Billmers | C09D 103/06 106/207.1 |

(Continued)

FOREIGN PATENT DOCUMENTS

JP          07-331196 A   * 12/1995
JP       2003-238734 A   *  8/2003
(Continued)

Primary Examiner — Vivian Chen
(74) Attorney, Agent, or Firm — Dave Law Group LLC; Raj S. Dave

(57) ABSTRACT

An embodiment relates to a multi-layer, biaxially oriented polyester (BOPET) film comprising a food contact substance, wherein the BOPET has a percent release in a retort test after can lamination such that substantially all food contacting the BOPET during the retort test is released. Another embodiment relates to a method comprising applying a food contact material comprising a food contact substance to a multi-layer, biaxially oriented polyester (BOPET) film, wherein the food contact material is prepared at around room temperature without heating.

12 Claims, No Drawings

(56) References Cited

U.S. PATENT DOCUMENTS

| | | | | |
|---|---|---|---|---|
| 6,287,658 B1* | 9/2001 | Cosentino | ............... | B32B 7/06 428/40.1 |
| 6,692,801 B1* | 2/2004 | Berlin | ............... | B32B 27/10 428/34.2 |
| 6,911,255 B2* | 6/2005 | Posey | ............... | B32B 27/08 428/336 |
| 2002/0045051 A1* | 4/2002 | Fujii | ............... | B32B 15/08 428/458 |
| 2003/0194501 A1* | 10/2003 | Urscheler | ............... | B05D 1/305 427/420 |
| 2003/0207038 A1* | 11/2003 | Han | ............... | C09D 103/06 427/384 |
| 2004/0115424 A1* | 6/2004 | Cowton | ............... | C08J 7/047 428/327 |
| 2004/0121079 A1* | 6/2004 | Urscheler | ............... | B05D 1/305 427/420 |
| 2004/0121080 A1* | 6/2004 | Urscheler | ............... | B05D 1/305 427/420 |
| 2004/0219316 A1* | 11/2004 | Takahashi | ............... | B32B 15/08 428/35.7 |
| 2005/0208282 A1* | 9/2005 | Wood, Jr. | ............... | B32B 27/36 428/216 |
| 2005/0287248 A1* | 12/2005 | Jabar, Jr. | ............... | D21H 19/12 426/89 |
| 2006/0122318 A1* | 6/2006 | Jho | ............... | C09D 5/024 524/501 |
| 2006/0243626 A1* | 11/2006 | Spaans | ............... | C08L 67/02 206/484 |
| 2006/0263495 A1* | 11/2006 | Langton | ............... | B65D 57/00 426/132 |
| 2009/0068481 A1* | 3/2009 | Yamanaka | ............... | B32B 15/08 428/458 |
| 2009/0104314 A1* | 4/2009 | Dellinger | ............... | A21B 3/13 426/72 |
| 2009/0181244 A1* | 7/2009 | Fukugami | ............... | B32B 27/08 428/336 |
| 2009/0314183 A1* | 12/2009 | Tripathi | ............... | C08L 3/02 106/206.1 |
| 2011/0206914 A1* | 8/2011 | Hartmann | ............... | D21H 19/82 428/212 |
| 2011/0220645 A1* | 9/2011 | Niederst | ............... | B32B 27/20 220/200 |
| 2011/0236540 A1* | 9/2011 | Owensby | ............... | B32B 27/34 426/106 |
| 2011/0293957 A1* | 12/2011 | Johansson | ............... | C08L 3/02 428/533 |
| 2012/0213896 A1* | 8/2012 | Owensby | ............... | B32B 27/08 426/113 |
| 2013/0040158 A1* | 2/2013 | Marakainen | ............... | C08L 3/02 428/533 |
| 2013/0313153 A1* | 11/2013 | Orsini | ............... | B32B 27/00 206/524.3 |
| 2014/0339123 A1* | 11/2014 | Nakagawa | ............... | B32B 15/09 206/524.2 |
| 2015/0064378 A1* | 3/2015 | Kawakusu | ............... | B65D 25/14 428/35.8 |
| 2015/0122812 A1* | 5/2015 | Nakagawa | ............... | B32B 15/09 220/62.13 |

FOREIGN PATENT DOCUMENTS

| | | | | |
|---|---|---|---|---|
| JP | 2004-162073 A | * | 6/2004 | |
| JP | 2005-153319 A | * | 6/2005 | |
| JP | 2013-112709 A | * | 6/2013 | |
| WO | WO 97/23390 A | * | 3/1997 | |
| WO | WO 2006-065196 A | * | 6/2006 | |

* cited by examiner

STARCH COATED POLYESTER FILM FOR RELEASE OF CANNED MEAT PRODUCTS

FIELD OF INVENTION

This invention relates to a multi-layer, biaxially oriented polyester (BOPET) film with a novel coating layer which has a direct food contact release surface. More particularly, the invention relates to a new coated polyester film that has a release coated layer, produced inline during the film making process, which will aid in the release of a high protein food source when said food is cooked and sterilized in the can and a heat sealable layer which can be laminated to metals in food canning containers.

BACKGROUND OF INVENTION

Principles of Food Canning

Food and Agriculture Organization of the United States— Food and Sterilization Procedures states that unlike pasteurized "cooked" meat products where the survival of heat resistant microorganisms is accepted, the aim of sterilization of meat products is the destruction of all contaminating bacteria including their spores. Heat treatment of such products must be intensive enough to inactivate/kill the most heat resistant bacterial microorganisms, which are the spores of *Bacillus* and *Clostridium*. In practice, the meat products filled in sealed containers are exposed to temperatures above 100° C. in pressure cookers. Temperatures above 100° C., usually ranging from 110-121° C. depending on the type of product, must be reached inside the product. Products are kept for a defined period of time at temperature levels required for the sterilization depending on type of product and size of container.

If spores are not completely inactivated in canned goods, vegetative microorganisms will grow from the spores as soon as conditions are favorable again. In the case of heat treated processed meat, favorable conditions will exist when the heat treatment is completed and the products are stored under ambient temperatures. The surviving microorganisms can either spoil preserved meat products or produce toxins which cause food poisoning of consumers.

In embodiments herein only fully sterilized meat products, which can be stored under ambient temperatures, are considered. So called semi- or three-quarter sterilized products, which require lower than ambient storage temperatures, are not considered as they are not particularly well suited for developing countries.

Amongst the two groups of spore producing microorganisms, *Clostridium* is more heat resistant than *Bacillus*. Temperatures of 110° C. will kill most *Bacillus* spores within a short time. In the case of *Clostridium* temperatures of up to 121° C. are needed to kill the spores within a relatively short time.

The above sterilization temperatures are needed for short-term inactivation (within a few seconds) of spores of *Bacillus* or *Clostridium*. These spores can also be killed at slightly lower temperatures, but longer heat treatment periods must be applied in such cases to arrive at the same level of heat treatment.

From the microbial point of view, it would be ideal to employ very intensive heat treatment which would eliminate the risk of any surviving microorganisms. However, most canned meat products cannot be submitted to such intensive heat stress without suffering degradation of their sensory quality such as very soft texture, jelly and fat separation, discoloration, undesirable heat treatment taste and loss of nutritional value (destruction of vitamins and protein components).

In order to comply with above aspects, a compromise has to be reached in order to keep the heat sterilization intensive enough for the microbiological safety of the products and as moderate as possible for product quality reasons.

A method was developed for such a balance between food safety and food quality requirements by measuring and quantifying the summary amount of heat treatment to which a canned product is exposed during the entire sterilization process.

Meat Products Suitable for Canning

Practically all processed meat products which require heat treatment during preparation for consumption are suitable for heat preservation. Meat products which do not receive any form of heat treatment before being consumed, such as dried meat, raw hams or dry sausages, are naturally not suitable for canning as they are preserved by low pH and/or low water activity.

The following groups of meat products are frequently manufactured as canned products:
  cooked hams or pork shoulders
  sausages with brine of the frankfurter type
  sausage mix of the bologna or liver sausage type
  meat preparations such as corned beef, chopped pork
  ready-to-eat dishes with meat ingredients such as beef in gravy, chicken with rice soups with meat ingredients such as chicken soup, oxtail soup Can Linings Metal food and beverage cans have lining on the interior surface, which is essential to prevent corrosion of the can and contamination of food and beverages with dissolved metals. In addition, the coating helps to prevent canned foods from becoming tainted or spoiled by bacterial contamination. The major types of interior can coating are made from epoxy resins, which have achieved wide acceptance for use as protective coatings because of their exceptional combination of toughness, adhesion, formability and chemical resistance. Such coatings are essentially inert and have been used for over 40 years. In addition to protecting contents from spoilage, these coatings make it possible for food products to maintain their quality and taste, while extending shelf life.

However, these epoxies contain a chemical called BPA or bisphenol A. which has faced much scrutiny from consumer advocacy groups. California proposed, for the second time, to list bisphenol A as a cause of reproductive toxicity under a state law called Proposition 65. Although the maximum allowable dose would be too high to require warning labels on most products, such as food cans that are lined with BPA-based epoxy resins, the proposal adds another reason that people might want to avoid the chemical.

In the past decade, consumers and health experts have raised concerns about the use of BPA in food packaging. The molecule has a shape similar to estrogen's and thus may act as an endocrine disrupter. The chemical industry and makers of metal food packaging contend that BPA is safe.

But for food companies, pleasing consumers is a high priority, and most are eager to move away from packaging based on BPA. Coating manufacturers and their suppliers are working overtime to find a replacement for the ubiquitous epoxies, which are made by reacting BPA with epichlorohydrin.

Heat sealable polyester film is one solution to replacing cans lined with an epoxy coating. Biaxially oriented polyester (BOPET) films are used for multiple applications such as food packaging, decorative, and label for example.

The food packaging industry commonly use BOPET films in many heat sealable tray applications where direct contact of food to BOPET is common, to take advantage of the intrinsic properties of BOPET such as clarity and tensile strength and its' inert chemical composition.

SUMMARY OF THE INVENTION

It is an object of this present invention to provide a polyester film which has superior heat resistance to be able to withstand the temperatures associated with retort sterilization temperatures and barrier properties to provide corrosion resistance to a metal container by a food product. The coated polyester film must also be capable of being laminated and formed to metal plates for the can forming process. Furthermore, the coating applied inline must be intact after the can forming process and be capable of providing a sufficient release surface to enable high protein food (meat products) to be easily removed from the can after high heat sterilization. The coating is also intended to be sacrificial in nature being absorbed onto the meat product and releasing from the polyester. Furthermore, the preferred coating employs a starch binder treated with NaOH, a wax additive and a crosslinker.

DETAILED DESCRIPTION OF THE INVENTION

The food release film may comprise one or more layers, preferably at least 3 layers. A multilayered food release film may include one or more of each of: a can-side or inside layer (i.e., heat seal layer), a food or outside layer, a coated layer which effects release of food There could also be multiple core layers between the heat sealant layer and the coating layer that effect barrier properties such as oxygen and moisture. This coating is in direct contact with the food in the can.

The starch is dissolved in a water/alkaline solution. The starch can also be heated in a water solution to dissolve the starch, but this creates an unwanted increase in viscosity. Besides keeping the viscosity low, alkaline treatment also creates carboxyl groups which are beneficial to crosslinking. Crosslinking increases the cohesiveness of the starch coating and prevents the coating from being removed from the polyester film prematurely during the can lamination stage. It is hypothesized that once the film is laminated to the can, the coating behaves as a sacrificial layer that bonds to the meat protein during the retort process and is removed with the meat protein preventing the meat protein from attaching to the polyester film.

Food Ingredients and Packaging Terms

The Food and Drug Administration (FDA) Data Standards Council is standardizing vocabulary across the FDA. Therefore, the wording in some terms below may change slightly in the future.

Biotechnology—refers to techniques used by scientists to modify deoxyribonucleic acid (DNA) or the genetic material of a microorganism, plant, or animal in order to achieve a desired trait. In the case of foods, genetically engineered plant foods are produced from crops whose genetic makeup has been altered through a process called recombinant DNA, or gene splicing, to give the plant desired traits. Genetically engineered foods are also known as biotech, bioengineered, and genetically modified, although "genetically modified" can also refer to foods from plants altered through methods such as conventional breeding. While in a broad sense biotechnology refers to technological applications of biology, common use in the U.S. has narrowed the definition to foods produced using recombinant DNA. For additional information, see the Biotechnology Program on the CFSAN Internet.

CEDI/ADI Database—For a large number of food contact substances, CFSAN maintains a database of Cumulative Estimated Daily Intakes (CEDIs) and Acceptable Daily Intakes (ADIs). The CEDIs and ADIs are based on currently available information and may be revised when information is submitted or made available. The CEDI/ADI database is updated approximately twice annually. The CEDIs and ADIs are based on currently available information and may be subject to revision on the basis of new information as it is submitted or made available to OFAS.

Color Additive—A color additive is a dye, pigment or other substance, which is capable of imparting color when added or applied to a food, drug, cosmetic, or to the human body. The legal definition can be found in Section 201(t) of the Federal Food, Drug, and Cosmetic Act (FD&C Act) and provides exclusions as well. Color additives for use in food, drugs, and cosmetics require premarket approval. Color additives for use in or on a medical device are subject to premarket approval, if the color additive comes in direct contact with the body for a significant period of time. For additional information, consult the Color Additive Program on the CFSAN Internet.

Colorant—A colorant is a dye, pigment, or other substance that is used to impart color to or to alter the color of a food-contact material, but that does not migrate to food in amounts that will contribute to that food any color apparent to the naked eye. The term 'colorant' includes substances such as optical brighteners and fluorescent whiteners, which may not themselves be colored, but whose use is intended to affect the color of a food-contact material. (21 CFR 178.3297(a)).

EAFUS—The "Everything Added to Food in the United States" (EAFUS) database is an informational database maintained by CFSAN under an ongoing program known as the Priority-based Assessment of Food Additives (PAFA). PAFA contains administrative, chemical and toxicological information on over 2000 substances directly added to food, including substances regulated by the FDA as a direct food additive, secondary direct food additive, color additive, GRAS and prior-sanctioned substance. In addition, the database contains only administrative and chemical information on approximately 1000 such substances. Information about the more than 3000 total substances comprise EAFUS. For a complete listing of EAFUS substances, see the EAFUS list.

Food Additive—A food additive is defined in Section 201(s) of the FD&C Act as any substance the intended use of which results or may reasonably be expected to result, directly or indirectly, in its becoming a component or otherwise affecting the characteristic of any food (including any substance intended for use in producing, manufacturing, packing, processing, preparing, treating, packaging, transporting, or holding food; and including any source of radiation intended for any such use); if such substance is not GRAS or sanctioned prior to 1958[1] or otherwise excluded from the definition of food additives.

Food Contact Substance (FCS)—Section 409 of the FD&C Act defines an FCS as any substance that is intended for use as a component of materials used in manufacturing, packing, packaging, transporting, or holding food if such use of the substance is not intended to have any technical effect in such food. Additional information can be found on the Food Contact Substances Notification Program page.

There is a hierarchy from Food Contact Substance (FCS) through Food Contact Material (FCM) to Food Contact Article (FCA).

The Food Contact Substance (the subject of an FCN) is a single substance, such as a polymer or an antioxidant in a polymer. As a substance, it is reasonably pure (the Chemist's definition of substance). Even though a polymer may be composed of several monomers, it still has a well-defined composition.

Food Contact Material (FCM) is made with the FCS and (usually) other substances. It is often (but not necessarily) a mixture, such as an antioxidant in a polymer. The composition may be variable.

The Food Contact Article is the finished film, bottle, dough hook, tray, or whatever that is formed out of the FCM.

GRAS—"GRAS" is an acronym for the phrase Generally Recognized As Safe. Under sections 201(s) and 409 of the FD&C Act, any substance that is intentionally added to food is a food additive, that is subject to premarket review and approval by FDA, unless the substance is generally recognized, among qualified experts, as having been adequately shown to be safe under the conditions of its intended use, or unless the use of the substance is otherwise excluded from the definition of a food additive. GRAS substances are distinguished from food additives by the type of information that supports the GRAS determination, that it is publicly available and generally accepted by the scientific community, but should be the same quantity and quality of information that would support the safety of a food additive. Additional information on GRAS can be found on the GRAS Notification Program page.

Guidance Document—Guidance documents are documents prepared for FDA staff, applicants/sponsors, and the public that describe the agency's interpretation of or policy on a regulatory issue. Guidance documents include, but are not limited to, documents that relate to the design, production, labeling, promotion, manufacturing, and testing of regulated products; the processing, content, and evaluation or approval of submissions; and inspection and enforcement policies. Guidance documents do not legally bind the public or FDA or establish legally enforceable rights or responsibilities. They represent the agency's current thinking (21 CFR 10.115). A complete listing of CFSAN's guidance documents is available on the Internet.

Indirect Food Additive—In general, these are food additives that come into contact with food as part of packaging, holding, or processing, but are not intended to be added directly to, become a component, or have a technical effect in or on the food. Indirect food additives mentioned in Title 21 of the U.S. Code of Federal Regulations (21 CFR) used in food-contact articles, include adhesives and components of coatings (Part 175), paper and paperboard components (Part 176), polymers (Part 177), and adjuvants and production aids (Part 178). Currently, additional indirect food additives are authorized through the food contact notification program. In addition, indirect food additives may be authorized through 21 CFR 170.39.

PAFA—The Priority based Assessment of Food Additive (PAFA) database is a database that serves as CFSAN's institutional memory for the toxicological effects of food ingredients known to be used in the United States. Currently, PAFA contains oral toxicology information on over 2100 of approximately 3300 direct food ingredients used in food in the US. PAFA also contains minimal information on over 3200 indirect additives including the names, CAS number and regulatory information of the indirect additives in the Code of Federal Regulations. The EAFUS list and the Indirect Additive list on the CFSAN Internet consist of selected fields of information generated from PAFA.

Prior Sanctioned Substance—A substance whose use in or on food is the subject of a letter issued by FDA or USDA offering no objection to a specific use. The prior sanction exists only for a specific use of a substance in food delineating level(s), condition(s) and product(s) set forth by explicit approval by FDA or USDA prior to Sep. 6, 1958. Some prior sanctioned substances are codified in 21 CFR Part 181.

SCOGS Report—"SCOGS" is the acronym for the Select Committee On GRAS Substances. Beginning in 1972, under a contract with FDA, the Life Sciences Research Office of the Federation of American Societies for Experimental Biology convened the Select Committee, which independently undertook a comprehensive review of the safety and health aspects of GRAS food substances on the FDA's then proposed GRAS list. The Select Committee published its evaluations in a series of reports known as the SCOGS Reports. A listing of opinions and conclusions from 115 SCOGS reports published between 1972 and 1980 is available on the CFSAN Internet.

Secondary Direct Food Additive—This term is in the title of 21 CFR 173, which was created during recodification of the food additive regulations in 1977. A secondary direct food additive has a technical effect in food during processing but not in the finished food (e.g., processing aid). Some secondary direct food additives also meet the definition of a food contact substance. For more on food contact substances, consult the Food Contact Substance Notification Program.

Threshold of Regulation (TOR) Exemption—A substance used in a food contact article may be exempted from the requirement of a food additive listing regulation if the use in question has been shown to meet the requirements in 21 CFR 170.39. For details, see 21 CFR 170.39. For a complete listing of the TOR exemptions, consult the Threshold of Regulation inventory on the CFSAN Internet.

Film

The present invention comprises a polyester film which can be laminated to a metal plate for canning which is typically made of tin-free steel, with a dimensional change of not more than 2.0% after a heat treatment of 210° C.

The film is biaxially oriented and has at least two layer structure A/B, wherein A is a layer made from polyester having a melting point of 200-235° C. referred to as amorphous polyester (APET) which is laminated to the metal plate and B which has a melting point of 240-260° C. referred to as crystalized polyester (CPET)

The above mentioned film also has a release coating which is applied inline to the CPET side of the film during the film making process.

Polyester Film and Process

Preferably the PET film suitable for use in the embodiments herein is biaxially oriented prior to laminating it to the metal substrate. The films are biaxially oriented by conventional methods. Typically, a raw material PET resin is supplied in solid form to a melt processing device, preferably a continuous screw extruder. The heating of the melt processor is controlled to maintain the PET resin above its melting point but below polymer degradation temperature. PET molten resin is extruded from an appropriately shaped die to form a thin, flat ribbon of polymer melt. The polymer ribbon is quenched in air and or on a chilled roll to form a solid, self-supporting film. The film is taken up by sets of rollers turning at different rotation speeds that stretch the film in the direction of continuous forward motion, referred to as the machine direction ("MD"). The stretching can be accompanied by heating of the film to establish crystal orientation in the MD. The mono-directionally oriented film is clamped at its opposite edges in and stretched in the transverse machine direction ("TD") laterally perpendicular to the MD in a tenter oven. The tenter oven is heated to temperatures operative to establish crystal orientation in the TD thus forming a biaxially oriented PET film. Preferably biaxially oriented PET film for use in the embodiments herein is stretched about 100%-400% in the MD and 100%-600% in the TD. The biaxially oriented film can be heat set at temperatures can be preferably between about 300° F. and about 490° F., more preferably about 350° F. to about 460 F.

The coating is applied after the MD stretch and is stretched in the TD direction along with the film and must be compatable with the thermal conditions necessary to heat set the film as mentioned above.

Coating

A food release coating that contains an effective amount one or more agents. The coating is typically applied to CPET side of the film—the food side. The coating ingredients must be able to survive though the film making conditions, and also avoid transferring to the non-food side of the film with an agent that may reduce the adhesion of the APET, heat extrusion or adhesive layer that will be coated or extruded on the non-food side. The coating that we used in our product adhered well to the CPET polyester film.

Starch

Modified starches provide a solution for a wide variety of papermaking applications such as sizing, retention, strength, film-forming and coating. Starches are also used in adhesives used for corrugated boxes, multiwall bag. The textile industry relies on starches for sizing and finished fabrics. It is also used as natural binder systems for granular and fibrous applications for many different building products. Ceiling tiles, wallboard, paint and building adhesives are several examples. Starch can help optimize mining and drilling operations with natural binders and recovery aids.

Acid-treated starch, also called thin boiling starch, is prepared by treating starch or starch granules with inorganic acids, e.g. hydrochloric acid breaking down the starch molecule and thus reducing the viscosity.

Other treatments producing modified are:
dextrin roasted starch with hydrochloric acid
alkaline-modified starch with sodium hydroxide or potassium hydroxide
bleached starch with hydrogen peroxide
oxidized starch with sodium hypochlorite, breaking down viscosity
enzyme-treated starch maltodextrin, cyclodextrin
monostarch phosphate with phosphorous acid or the salts sodium phosphate, potassium phosphate, or sodium triphosphate to reduce retrogradation
distarch phosphate by esterification with for example sodium trimetaphosphate, crosslinked starch modifying the rheology, the texture
acetylated starch esterification with acetic anhydride
hydroxypropylated starch, starch ether, with propylene oxide, increasing viscosity stability
hydroxyethyl starch, with ethylene oxide
starch sodium octenyl succinate starch used as emulsifier adding hydrophobicity
starch aluminium octenyl Succinate cationic starch, adding positive electrical charge to starch
carboxymethylated starch with monochloroacetic acid adding negative charge
and combined modifications such as
phosphated distarch phosphate
acetylated distarch phosphate
acetylated distarch adipate
hydroxypropyl distarch phosphate
acetylated oxidized starch Crosslinking Oxidation of starch mainly causes the scission of the glucosidic linkages and oxidation of hydroxyl groups to carbonyl and carboxyl groups. The scission of the glucosidic linkage results in depolymerization of amylose and amylopectin, hence decreases swelling power and paste viscosity. Formation of the carbonyl and carboxyl groups discontinuously along the chains reduces gelatinization temperature, increases solubility, and decreases gelation.

Crosslinker

It is believed that after oxidation with NaOH to control the viscosity, the main functional group would still be the hydroxyl groups. Berrcet 2040 was chosen because it is a highly effective insolubilizing and crosslinking agent based on dialdehyde chemistry. Bercet 2040's reactivity is greatly accelerated during the drying cycle which results in higher wet rub and wet pick resistance. It also crosslinks all normally used synthetic and natural binders in pigmented or non-pigmented systems as well as reacting with the hydroxyl or amino group containing coating binders.

In regards to food contact, Bercet 2040 is FDA compliant, subject to the provisions of: Title 21 CFR 176.180 without limitations, and Title 21 CFR 176.170, when used as an insolubilizing agent in starch and protein based coatings that contact foods.

Gelatin Test

In order to screen and test coating for release, a 5% gelatin solution was used as a substitute to a meat product. The gelatin was dissolved in boiling water and applied to the coated substrate while hot and left to dry overnight. As the gelatin cooled, it solidified on the surface with varying levels of release from the coating. A rating of 1 indicates complete release from the coating. 2 partial and 3 no release.

Tape Test

After drying, 3M 810 tape is applied to the coating surface with heavy finger pressure. The tape is then pulled off at a 45 degree angle as quickly as possible. The area under the tape was given a subjective rating from 1-3 based on how much of the coating has been pulled away from the surface. 1 being no coating removal, 2 being ~20% and 3 being greater than 30% removal. This test is a measure how well the coating is adheres to the polyester film Retort Test A food mixture of egg/beef/flour at a ratio of 3/2/1 was prepared. The coated film was placed in a 8 oz glass canning jar with the coated layer facing the interior of the jar. If the laminated can is being tested a circular metal disk which has been laminated with coated polyester in a previous step is placed at the bottom of the jar. The meat mixture was placed in the jar against the coated side of the polyester. The jar is sealed, placed in a pressure cooker with water and heated to boiling on a hot. As used in relation to this invention, the term "retort process" means a procedure in which the inside or outside of a metal container with a wall composed of a composite of a metal substrate having a polymer film laminated onto the inside, the outside or both sides of the substrate is treated with live steam for a period of time. "Live steam" means that steam directly contacts the surface of the container. The steam is usually superheated, i.e., above the boiling point of water. A nominal retort process calls for exposure to steam at temperature of 260° F. for 90 minutes. The temperature and duration of exposure of the retort process can vary to provide an approximately equivalent sterilization and food pasteurization effectiveness. For example, the temperature might be higher for a shorter duration or lower for a longer duration.

The jars were removed after 90 minutes and left to cool. The jars are tipped over and were rated with a percentage of how much food mixture easily fell off the film or laminated can.

The term "substantially all food contacting the BOPET during the retort test is released" means that the percent release in the retort test before and after can lamination is greater than 80 percent, preferably at least 85 percent.

Process of Dissolving Starch

Starch granules are insoluble in cold water. When starch is heated in water, granules absorb water and swell. The absorption of water by amorphous regions within the granules destabilizes their crystalline structure. Upon continuous heating, granules tend to swell to greater extents, and the crystallites melt, resulting in increased molecular motion that eventually leads to complete separation of amylose and amylopectin. The typical way to dissolve starch in water is by heating to 160-180 F for 10 min. This method leads to an unwanted increase in viscosity which would limit the amount of solids that can be used in a coating recipe. Using a Brookfield Viscosity (spindle #2 @ 100 rpm) the viscosity using this method is ~100 cps.

A preferred method of dissolving starch in water is to use an alkali to depolymerize the amylose and amylopectin, which decreases the swelling power of the starch. The viscosity using this method is ~10 cps.

EXAMPLES AND COMPARATIVE EXAMPLES

The invention is better understood with reference to the following Examples (Ex.) and Comparative (C. Ex.) to illustrate specific embodiments within the overall scope of the invention.

Comparative Example 1

Acrylic emulsion, Neocryl A1095, was diluted to 8% solids with water and 4% wax emulsion was added and coated with a #3 mayer rod. After stretching 400% this gives an effective dry coat weight of 0.11 gsm. This film passes the retort and gelatin test but an acrylic polymeric binder would be not be favorable as a food additive.

Example 2

9% Starch, Purecoat B792 from GPC, is dispersed in water and then 2% solution of 10% Sodium hydroxide solution is mixed in. This does not have a wax additive. This passes the gelatin, retort and tape release tests and does not interfere or detract from food taste.

Example 3

9% Starch, Purecoat B790 from GPC, is dispersed in water and a 2% solution of 10% sodium hydroxide solution is added. A 1% solution of wax emulsion Syncera CW1245 fom Paramelt is also added. This passes the gelatin, tape and retort test and is the preferred example to pass both can lamination and the retort test Comparative Example 4

The polyester film without the release coat does not pass the retort and gelatin tests.

Comparative Example 5

100% canauba wax only. Release is good with the retort test before lamination but fails the retort test after lamination. This shows that the wax is sacrificial and is lost or reduced during the can lamination process.

Comparative Example 6

Starch that is hydrated under normal thermal conditions with no NaOH and wax additives does not have high enough release properties after retort.

Comparative Example 7

Starch oxidized with higher amount of NaOH showed poor release on the retort tests. It is hypothesized the higher pH degrades the proteins in the starch as opposed to creating crosslinking sites. Ideally NaOH addition should be 2-4% of the coating.

Comparative Example 8

8% Starch, Purecoat B792 by GPC was dissolved by the standard thermal method of heating in water for 10 minutes. A wax additive, Syncera CW 1245, Carnuba wax, was mixed into this solution. This did not pass the gelatin test and did not have the best adhesion before or after the retort test. The viscosity of this solution was 100 cps.

Table 1 shows data on composition and test results of examples and comparative examples.

TABLE 1

Test data on composition and test results

| Example # | Coating Composition % | | | | | | Gelatin Test ranking | Tape Test ranking | Retort Test after can lamination % release | Retort Test before can lamination % release |
| --- | --- | --- | --- | --- | --- | --- | --- | --- | --- | --- |
| | Starch | Acrylic | NaOH | Glyoxal | wax | water | | | | |
| C. Ex. 1 | 0 | 8 | 0 | 0 | 4 | 88 | 1 | 2 | 90 | 100 |
| Ex. 2 | 9 | 0 | 2 | 4 | 0 | 85 | 1 | 1 | 90 | 100 |
| Ex. 3 | 9 | 0 | 2 | 4 | 1 | 84 | 1 | 1 | 100 | 100 |
| C. Ex. 4 (base film) | 0 | 0 | 0 | 0 | 0 | 0 | 3 | 3 | 50 | 60 |
| C. Ex. 5 | 0 | 0 | 0 | 0 | 6 | 94 | 1 | 3 | 70 | 90 |
| C. Ex. 6 | 8 | 0 | 0 | 4 | 4 | 84 | 3 | 1 | 80 | 80 |

TABLE 1-continued

Test data on composition and test results

| Example # | Coating Composition % | | | | | | Gelatin Test ranking | Tape Test ranking | Retort Test after can lamination % release | Retort Test before can lamination % release |
| --- | --- | --- | --- | --- | --- | --- | --- | --- | --- | --- |
| | Starch | Acrylic | NaOH | Glyoxal | wax | water | | | | |
| C. Ex. 7 | 9 | 0 | 5 | 4 | 0 | 82 | 3 | 1 | 50 | 60 |
| C. Ex. 8 | 8 | 0 | 0 | 0 | 4 | 87 | 3 | 2 | 70 | 80 |

Table 2 shows list of additives used in the embodiments herein.

TABLE 2

Additives

| Company | Name | Description | Additive type |
| --- | --- | --- | --- |
| DSM Neoresins | Neocryl A 1095 | Acrylic emulsion | Binder |
| Grain Processing Corp. (GPC) | Purecoat B 792 | Modified Food Starch | Binder |
| Grain Processing Corp | Purecoat B 790 | Modified Food Starch | Binder |
| Paramelt BV | Syncera CW 1245 | Canauba Wax emulsion | Release |
| Aldrich | NaOH | Sodium Hydroxide | pH control |
| Bercen Inc | Bercet 2040 | Glyoxal | crosslinker |

What is claimed is:

1. A film comprising a multi-layer film, comprising a base film comprising biaxially oriented polyester (BOPET) film and a release coating; the BOPET film having at least an A/B structure wherein layer A consists of an amorphous PET polyester with a melting point of 200-235° C. and layer B consists of a crystallized PET polyester with a melting point of 240-260° C., the release coating comprising a food contact substance comprising a starch in the coating, a release agent and a crosslinking agent that crosslinks the starch; the release coating is separate from the BOPET film and on the layer B, wherein the release coating has a percent release in a retort test after can lamination such that substantially all food contacting the release coating during the retort test is released.

2. The film of claim 1, wherein the release coating has a percentage release of at least 90 percent in a retort test after can lamination.

3. The film of claim 1, wherein the release agent comprises a wax.

4. The film of claim 1, wherein the crosslinking agent comprises glyoxal.

5. The film of claim 4, wherein the food contact substance comprises the starch and the glyoxal.

6. The film of claim 4, wherein the food contact substance comprises the starch and the glyoxal and a wax.

7. The film of claim 1, wherein the film contains no acrylic or bisphenol A.

8. The film of claim 1, wherein a gelatin solidified on a surface of the release coating is completely released from the release coating and wherein the release coating does not peel off from the base film by a tape test.

9. The film of claim 1, wherein the crosslinking agent comprises glyoxal, wherein the release coating further comprises NaOH.

10. The film of claim 1, wherein the release coating consists of the food contact substance consisting of the starch, the release agent, the crosslinking agent, and optionally NaOH and/or water.

11. The film of claim 1, wherein the release coating consists of the food contact substance consisting of the starch, the release agent, the crosslinking agent, NaOH and/or water.

12. The film of claim 1, wherein the A/B structure consists of the layer A and the layer B.

* * * * *